United States Patent
Zoller

(10) Patent No.: US 12,358,085 B2
(45) Date of Patent: Jul. 15, 2025

(54) SHRINK-CLAMPING COOLING DEVICE, COOLING STATION AND METHOD

(71) Applicant: E. Zoller GmbH & Co. KG Einstell- und Messgeraete, Pleidelsheim (DE)

(72) Inventor: Alexander Zoller, Pleidelsheim (DE)

(73) Assignee: ZOLLER GMBH & CO. KG EINSTELL- UND MESSGERAETE, Pleidelsheim (DE)

( * ) Notice: Subject to any disclaimer, the term of this patent is extended or adjusted under 35 U.S.C. 154(b) by 0 days.

(21) Appl. No.: 18/339,072

(22) Filed: Jun. 21, 2023

(65) Prior Publication Data

US 2024/0051072 A1    Feb. 15, 2024

(30) Foreign Application Priority Data

Jun. 21, 2022  (DE) .......................... 102022115424.6

(51) Int. Cl.
  *B23P 11/02*  (2006.01)
(52) U.S. Cl.
  CPC ................................... *B23P 11/027* (2013.01)
(58) Field of Classification Search
  CPC ... B23B 31/1179; B23B 2250/12; H05B 6/38; H05B 3/06; H05B 3/40; B23P 11/027
  See application file for complete search history.

(56) References Cited

U.S. PATENT DOCUMENTS

| 10,129,933 B2 | 11/2018 | Haimer et al. | |
| 2001/0054471 A1* | 12/2001 | Kelch | B23P 11/027 156/85 |

FOREIGN PATENT DOCUMENTS

| DE | 202007003045 U1 * | 8/2008 | ......... B23B 31/1179 |
| DE | 102008053245 A1 * | 4/2010 | ........... B23P 11/027 |
| DE | 202015006540 U1 | 12/2015 | |
| DE | 102015009611 B3 | 12/2016 | |

OTHER PUBLICATIONS

English translation DE102008053245 (Year: 2008).*
English translation DE202007003045 (Year: 2008).*
Search Report for European Patent Application No. EP 23179328.2, mailed Nov. 28, 2023, 21 pages.
Search Report for German Patent Application No. DE 10 2022 115 424.6 dated Feb. 8, 2023, 13 pages.

* cited by examiner

*Primary Examiner* — Jason L Vaughan
*Assistant Examiner* — Amanda Kreiling
(74) *Attorney, Agent, or Firm* — Womble Bond Dickinson (US) LLP

(57) ABSTRACT

A shrink-clamping cooling device for a cooling of, in particular previously heated, tool holders comprises at least one cooling element which forms a cooling region for creating a heat-conductive contact with the tool holder that is to be cooled, wherein
that the cooling element comprises a contact switch, which is configured to detect at least a laying-in, and in particular a presence and/or a taking-out, of the tool holder that is to be cooled in the cooling region/out of the cooling region.

19 Claims, 5 Drawing Sheets

SHRINK-CLAMPING COOLING DEVICE, COOLING STATION AND METHOD

CORRESPONDENCE TO RELATED APPLICATION

Figure 1:
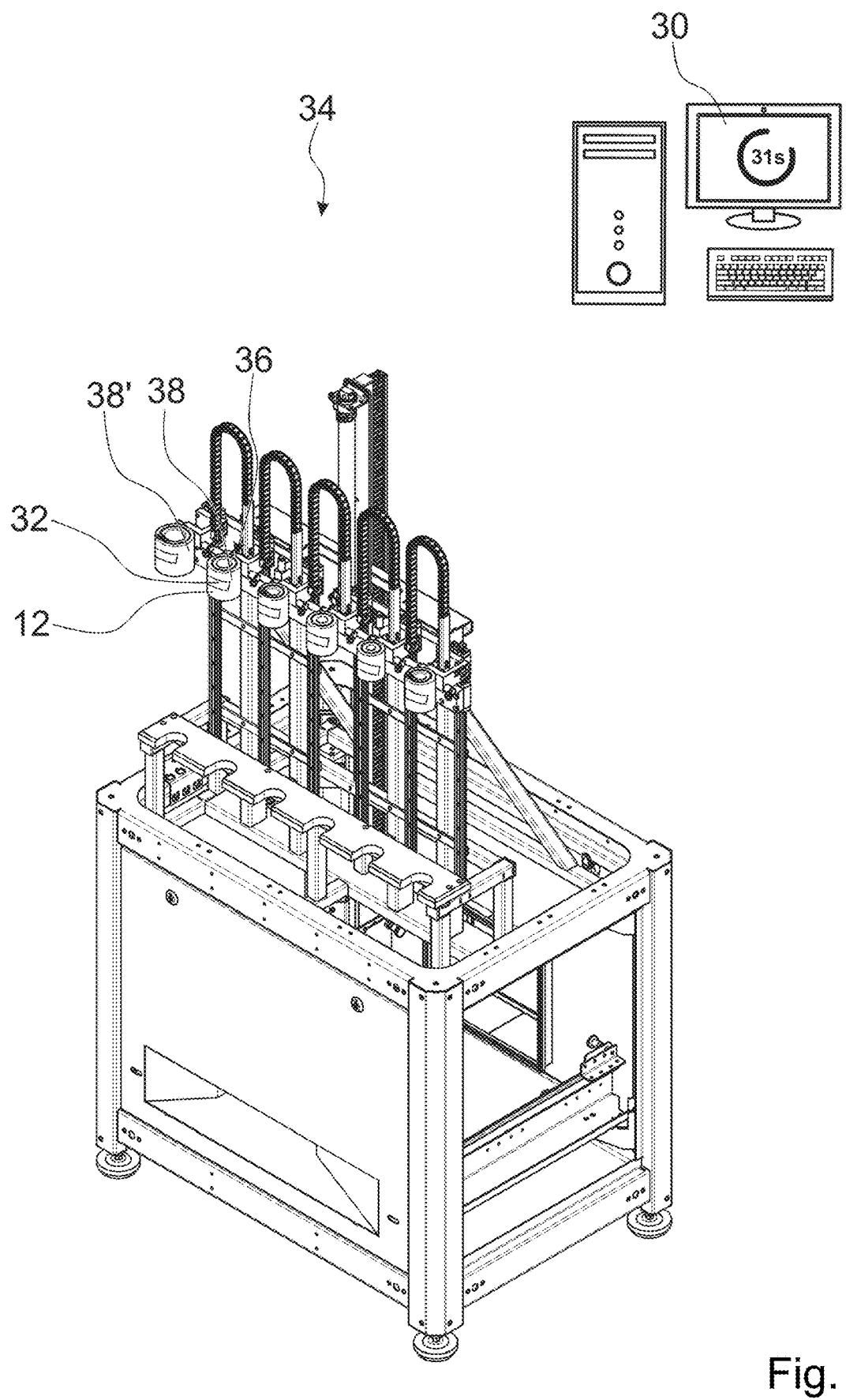

This application is based on and incorporates herein by reference the German patent application DE 10 2022 115 424.6, filed on Jun. 21, 2022.

PRIOR ART

The invention concerns a shrink-clamping cooling device, a cooling station for a shrink-clamping apparatus and a method.

A shrink-clamping cooling device for a cooling of previously heated tool holders, with at least one cooling element which forms a cooling region for establishing a heat-conductive contact with the tool holder that is to be cooled, has already been proposed.

The objective of the invention is in particular to provide a generic device having advantageous characteristics with regard to a cooling process at heat-shrink chucks. The objective is achieved according to the invention.

Advantages of the Invention

The invention is based on a shrink-clamping cooling device for a cooling of, in particular previously heated, tool holders, with at least one cooling element which forms a cooling region for establishing a heat-conductive contact with the tool holder that is to be cooled.

It is proposed that the cooling element comprises a contact switch, which is configured to detect at least a laying-in, and in particular a presence and/or a taking-out, of the tool holder that is to be cooled in the cooling region/out of the cooling region. This advantageously allows improving a cooling process for heat-shrink chucks. Advantageously, a high level of user-friendliness is achievable, in particular as no manual confirmation of an insertion of the tool holder into the shrink-clamping cooling device is required. Advantageously, a high level of operational safety is achievable, in particular as it is possible to avoid delayed activation or forgetting an activation of the cooling process. This moreover also allows augmenting an accuracy of a following tool measuring, in particular as it is possible to avoid too long or too short cooling of a tool holder with a mounted tool, which would thus be too cold or too warm in the tool measuring, such that a thermal length change after the tool measuring would lead to a false measuring result. This advantageously allows increasing procedural safety of the shrink-clamping and tool measuring process flow. It is furthermore advantageously possible to optimize a cycle time, in particular a throughput rate.

The shrink-clamping cooling device is in particular configured for lowering a temperature of a tool holder, in particular of a heat-shrink chuck and/or a collet chuck, preferably approaching said temperature to a room temperature (about 25° C.). Herein the tool holder may have been heated previously by means of an induction heating device, for example an induction coil, in the heating step of the tool shrink-clamping process. Alternatively or additionally, the tool or the collet chuck may herein have been heated by hot vapor in a vapor-cleaning step. By a "tool holder" is herein in particular a component to be understood which is in particular configured for receiving a tool, in particular a shaft of a shaft tool, and for a connection of the tool to a machine. The tool holder is in particular realized as a tool-machine interface. Preferably the tool holder is realized as a tool chuck, in particular a heat-shrink chuck. The tool is in particular embodied as a shaft tool, preferably as a rotary shaft tool, for example a drill, a milling tool, a profiling tool and/or a reamer. In particular, the cooling element is embodied as a contact cooling element, for example as a cooling bell or as a cooling cuff. The cooling element is in particular configured to create a heat-conductive touch contact at least to a clamping region of the tool holder, in particular of the heat-shrink chuck. In particular, the cooling element can be put upon the tool holder, in particular the clamping region of the heat-shrink chuck. In particular, the cooling element is cooled actively, for example by a cooling fluid flowing through the cooling element. In particular, the cooling element is flown through by a cooling fluid which is configured for an away-transfer of heat received from the tool holder, in particular from the heat-shrink chuck, via the heat-conductive contact.

The contact switch is in particular embodied as a microswitch. The contact switch is in particular configured to be switched (on) by coming into contact with the tool chuck, for example with the clamping region of the heat-shrink chuck. The contact switch is in particular configured to be switched (off) by a separation of a contact with the tool chuck, for example a separation from the clamping region of the heat-shrink chuck. The contact switch is in particular configured to remain in a switched-on state if there is a contact with the tool chuck, for example with the clamping region of the heat-shrink chuck. In particular, the contact switch is configured to be deflected by the laying-in of the tool holder that is to be cooled. In particular, the contact switch is configured, when the tool holder is taken out, to autonomously re-deflect into a position that can be deflected once again. "Configured" is in particular to mean specifically programmed, designed and/or equipped. By an object being configured for a certain function is in particular to be understood that the object fulfills and/or executes said certain function in at least one application state and/or operation state.

Furthermore, it is proposed that the contact switch is arranged within the cooling region. This advantageously enables a simple construction and/or a simple direct switching of the contact switch via the tool holder. It is moreover advantageously possible to prevent in the best possible way an erroneous detection of tool holders. In particular, the contact switch protrudes beyond a cooling contact surface of the cooling element, in particular the contact cooling element. In particular, the contact switch is surrounded, preferably at least in a circumferential direction completely surrounded, by the cooling contact surface of the cooling element, in particular the contact cooling element.

It is also proposed that, at least in a non-actuated state, the contact switch at least partly protrudes from a wall of the cooling element, in particular from the cooling contact surface, which delimits the cooling region. This advantageously enables reliable and/or simple direct switching of the contact switch by the tool holder. In particular, the contact switch protrudes from the wall of the cooling element, in particular from the cooling contact surface, which delimits the cooling region, by at least 0.5 mm, preferably at least 1 mm, advantageously at least 2 mm, preferentially at least 3 mm and especially preferentially maximally 10 mm. In particular, at least 3%, preferably at least 5% and preferentially no more than 15% of a total extension of the contact switch perpendicular to the surrounding cooling contact surface protrude from the cooling contact surface. In particular, the contact switch is in an actuated state completely sunk in the wall of the cooling element, in particular in the cooling contact surface, which delimits the cooling region.

In addition, it is proposed that the cooling region is realized as a cooling chamber, which is—at least in a radial direction of the cooling element—completely enclosed by the cooling element, and is in particular configured to receive at least to a large extent, preferably completely, a clamping region of the tool holder that is embodied as a heat-shrink chuck. This advantageously allows achieving even and/or effective contact cooling. For a cooling, the tool holder is in particular introduced into the cooling chamber partially, in particular in a direction that runs perpendicular to the radial direction. In particular, at least a clamping region of the heat-shrink chuck is introduced into the cooling chamber for a cooling. In particular, the cooling contact surface contacts at least a large portion of the clamping region of the heat-shrink chuck, preferably the entire clamping region of the heat-shrink chuck, in the cooling chamber.

If a contact tip of the contact switch, which protrudes from the wall of the cooling element, in particular from the cooling contact surface, delimiting the cooling region, has an at least substantially calotte-shaped, in particular spheric-calotte-shaped or dome-shaped, surface, it is advantageously possible to ensure reliable and/or secure laying-in of the tool holder. Advantageously, a risk of the tool holder getting wedged, in particular with the contact switch, and/or of damaging, in particular of the tool holder and/or of the contact switch, can be minimized. In particular, the contact tip of the contact switch is rounded at least on a side that is situated opposite a destinated insertion direction. A "substantially calotte-shaped" implementation is in particular to mean, in this context, any implementation of the contact tip of the contact switch in which the contact tip of the contact switch is rounded at least on the side situated opposite the insertion direction. In particular, the contact tip of the contact switch is realized in such a way that when coming into contact with the tool holder, the contact switch moves out of the way, without getting wedged, in a direction that is oblique or perpendicular to an insertion direction of the tool holder.

It is moreover proposed that the contact switch is embodied as a mechanical switch. In this way a high level of reliability, safety and/or a simple construction are/is attainable. In particular, the mechanical switch comprises at least one movably supported switch element, which is actuatable by the insertion of the tool holder into the cooling region.

If the contact switch is embodied as an elastically pre-tensioned pressure switch, advantageously an autonomous re-deflection is enabled. Advantageously, a high level of user comfort and/or a high operational safety are/is achievable in this way. In particular, the elastically pre-tensioned pressure switch is configured to return autonomously into an initial state (the non-actuated state).

It is further proposed that the contact switch penetrates at least one wall which delimits the cooling region, in particular an inner wall of the cooling element, preferably the cooling contact surface, in a radial direction. This allows obtaining an advantageous construction. In particular, it is moreover conceivable that the contact switch penetrates the cooling element to a large extent or even completely. A "large extent" is in particular to mean at least 51%, preferably at least 70%, preferentially at least 80% and especially preferentially at least 90%. Beyond this it is proposed that the shrink-clamping cooling device comprises a control unit, which is at least configured to detect a laying-in signal of the contact switch indicating at least the laying-in of a tool holder. In this way advantageously a high level of user comfort and/or a high operational safety are/is achievable, in particular due to a high degree of automatization. The laying-in signal may be realized as an electronic signal triggered by the contact switch. A "control unit" is in particular to mean a unit with at least one control electronics component. A "control electronics component" is in particular to mean a unit with a processor and with a data memory and with an operation program that is stored in the data memory.

If the control unit is at least configured, when receiving the laying-in signal, to start a counting of a cooling time, and/or if the control unit is at least configured, when receiving the laying-in signal, to start a countdown of a cooling time stored in the control unit, in particular for the respective tool holder, and in particular to transmit the countdown of the cooling time to a display unit of the shrink-clamping cooling device or of a cooling station comprising the shrink-clamping cooling device for a visual output of the countdown of the cooling time, this advantageously allows optimizing a cooling process. It is advantageously possible to ensure achieving an optimal cooling time. As a result, a high measuring accuracy of a tool measuring that follows the shrinking is achievable. It is conceivable that the counting of the cooling time and/or the countdown of the cooling time is outputted visually to an operator, for example via the display unit that is connected with the control unit, like for example a monitor. The cooling time may, for example, be 30 s, 40 s, 50 s, 1 min or a different time interval. The cooling time is in particular adapted to the respective tool holder that is to be cooled. For example, the respective appropriate cooling time is selected manually (by operator input) or automatedly (by tool holder recognition or by reading out data allocated to the tool holder) when the tool holder is put into the shrink-clamping cooling device.

If moreover the control unit is at least configured, when receiving the laying-in signal, to switch, in particular to activate and/or to switch in terms of coloring, an illuminated display, in particular of the shrink-clamping cooling device, that signals an active cooling process, a high level of user comfort is advantageously attainable. It is advantageously possible to ensure achieving an optimal cooling time. Advantageously, a cycle time and/or a throughput can be optimized. A risk of injury by touching hot tool holders is advantageously reducible. It is conceivable that the illuminated display is built in with the cooling element and/or integrated in the cooling element. Alternatively, however, the illuminated display may also be arranged separately from the cooling element. Preferably the illuminated display is configured for lighting at least a partial region of the cooling element. This advantageously allows achieving particularly favorable perceivability. For example, a green light of the illuminated display may signal the cooling element being operational. For example, a red light of the illuminated display may signal a cooling-down operation of the cooling element, in particular a cooling-down operation in which a final temperature of the tool holder has not been reached yet. For example, a blue light of the illuminated display may signal a termination of the cooling operation, in which the cooling element is still sitting on the tool holder while the final temperature of the tool holder has already been reached.

If the illuminated display is configured to signal the active cooling process, the terminated cooling process and/or the operational state of the cooling element by a color switching, it is advantageously possible to attain a high level of user-friendliness and/or a high degree of safety by a simple perception of warning signals.

It is also proposed that the control unit is at least configured, when receiving the laying-in signal, to activate a cooling function, for example a cooling fluid flow, of the cooling element, in particular of a cooling unit comprising the cooling element. This advantageously allows optimizing a cooling process. It is advantageously possible to ensure achieving an optimal cooling time. Advantageously, a high cycle time and/or a high throughput are/is attainable.

Moreover, it is proposed that the control unit is at least configured, when the cooling time, in particular the cooling time stored for the respective tool holder, has passed, to switch, in particular to deactivate and/or to switch in terms of coloring, the illuminated display that signals the active cooling process, and/or to deactivate the cooling function of the cooling element, in particular of the cooling unit comprising the cooling element. This advantageously allows optimizing a cooling process. It is advantageously possible to ensure achieving an optimal cooling time. Advantageously a high cycle time and/or a high throughput is achievable. The cooling unit in particular comprises at least the cooling element, a cooling fluid circuit and an active cooling fora cooling of the cooling fluid.

Furthermore, the cooling station for a shrink-clamping apparatus, in particular a shrink-clamping apparatus with a shrink-clamping device, is proposed. This advantageously allows improving a cooling process for heat-shrink chucks. In particular, the cooling station or the shrink-clamping apparatus may comprise a plurality of shrink-clamping cooling devices and/or of cooling elements with contact switches. It is conceivable that in the manual or automated selection of the tool holder the respectively corresponding cooling element is selected by means of the control unit and the selection is indicated by the respective illuminated display of the respective shrink-clamping cooling device or of the respective cooling element, for example by a blinking of the illuminated display.

Beyond this a method is proposed for an operation of the shrink-clamping cooling device with the at least one cooling element, which forms the cooling region for creating the heat-conductive contact with the tool holder that is to be cooled, the cooling element comprising the contact switch by means of which at least the laying-in, and in particular the presence and/or the taking-out, of the tool holder that is to be cooled into/in/from the cooling region is detected. This advantageously allows improving a cooling process for heat-shrink chucks.

It is further proposed that following a detection of a laying-in of the tool holder that is to be cooled into the cooling region, at least the countdown of the cooling time, in particular the cooling time stored for the respective tool holder, is started by the contact switch. In this way it is advantageously possible to ensure that an optimal cooling time is achieved.

Herein the shrink-clamping device according to the invention, the cooling station according to the invention and the method according to the invention shall not be limited to the application and implementation described above. In particular, in order to fulfill a functionality that is described here, the shrink-clamping device according to the invention, the cooling station according to the invention and the method according to the invention may comprise a number of individual elements, components and units that differs from a number given here.

DRAWINGS

Further advantages will become apparent from the following description of the drawings. In the drawings an exemplary embodiment of the invention is shown. The drawings, the description and the claims contain a plurality of features in combination. Someone skilled in the art will purposefully also consider the features separately and will find further expedient combinations.

Figure 2:
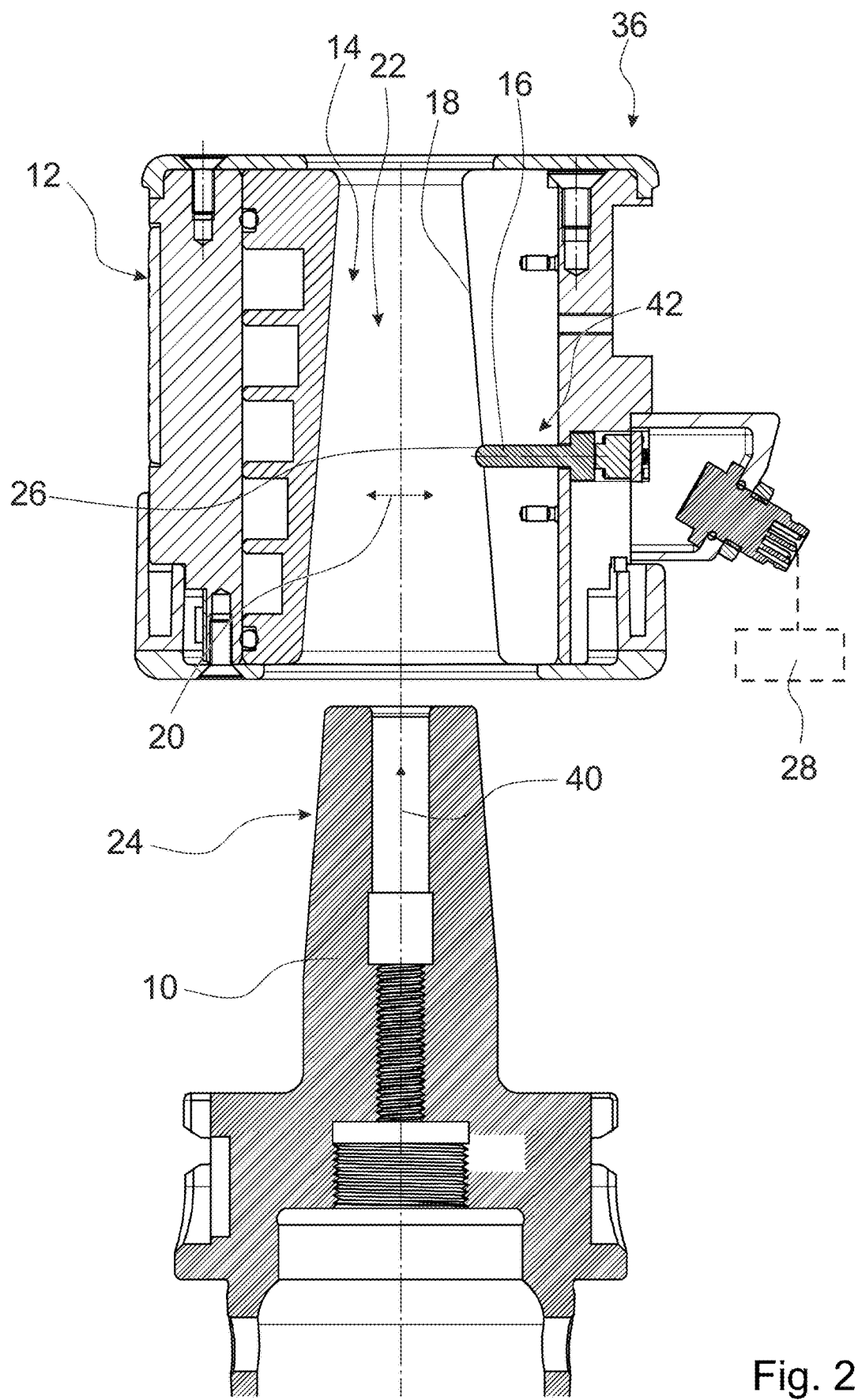
Figure 3:
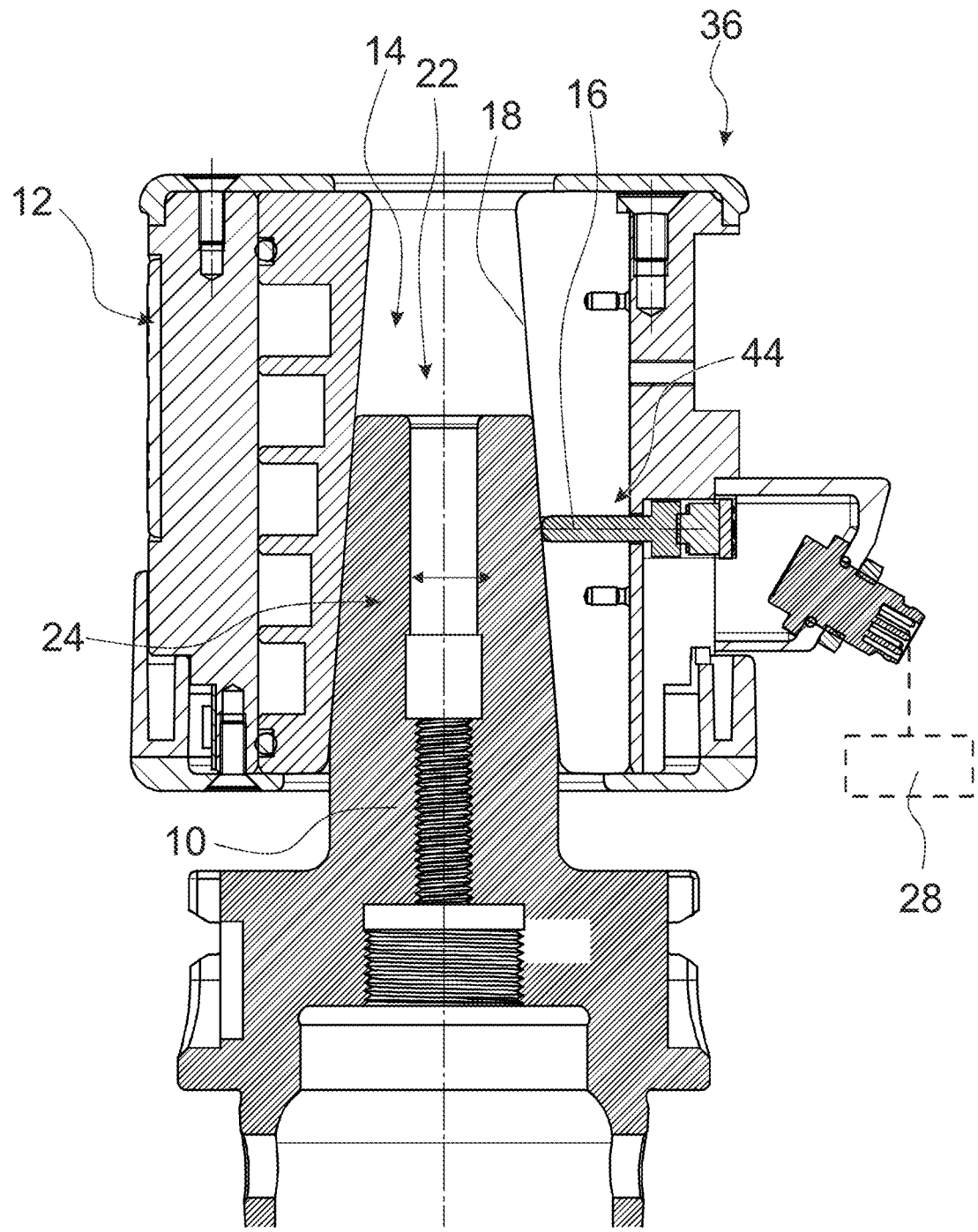
Figure 4:
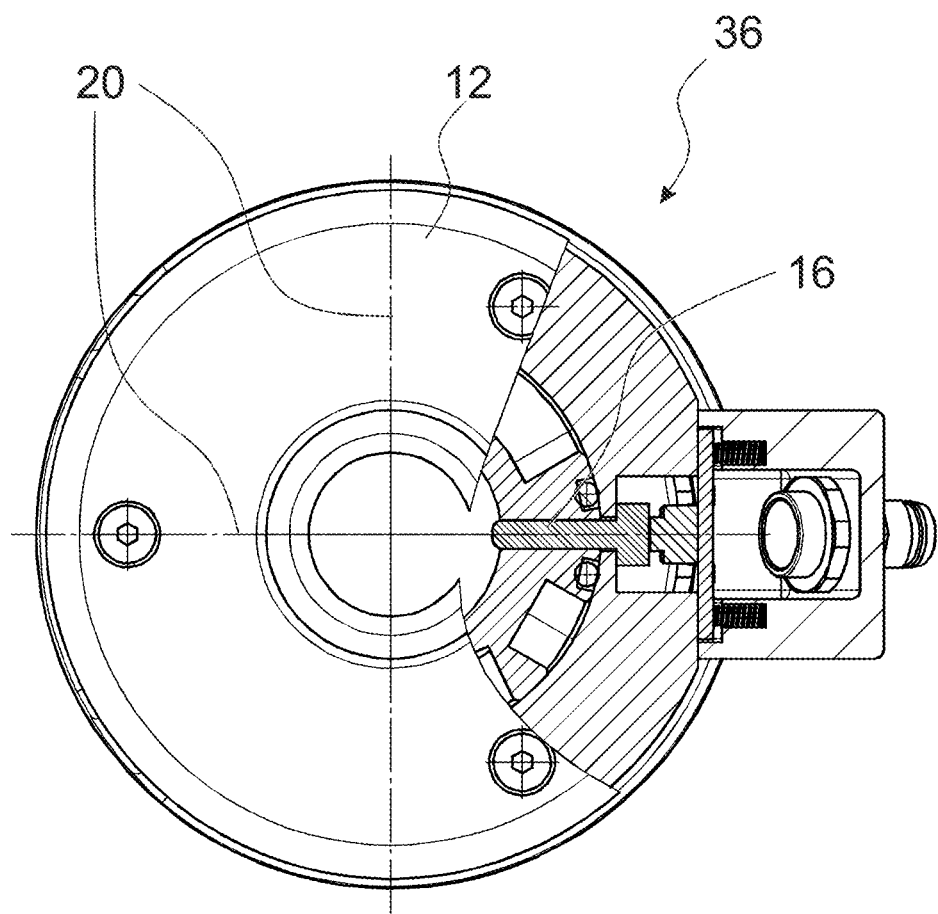
Figure 5:
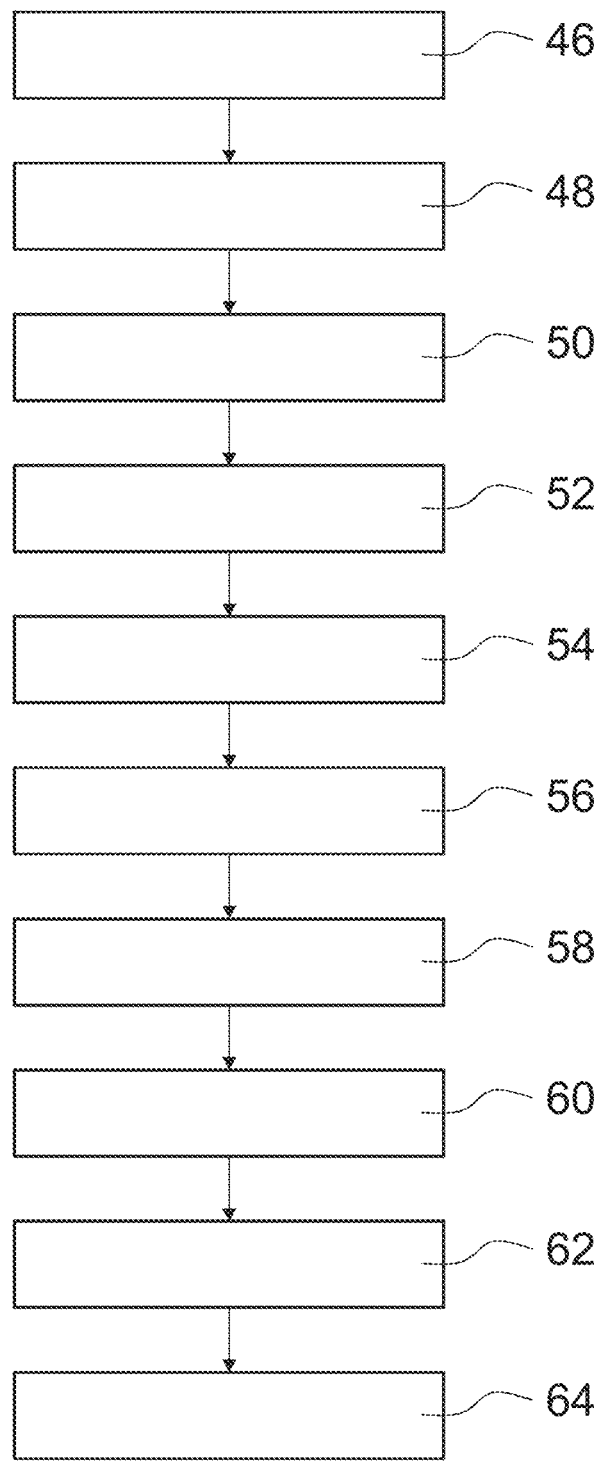

It is shown in:

FIG. 1 a schematic perspective illustration of a cooling station for a shrink-clamping apparatus with a shrink-clamping cooling device, FIG. 2 a schematic sectional side view of the shrink-clamping cooling device, with a contact switch in a non-actuated state, FIG. 3 a further schematic sectional side view of the shrink-clamping cooling device, with the contact switch in an actuated state;

FIG. 4 a partially sectioned view from above onto the shrink-clamping cooling device, with the contact switch in the non-actuated state, and FIG. 5 a schematic flowchart of a method for an operation of the shrink-clamping cooling device.

DESCRIPTION OF THE EXEMPLARY EMBODIMENT

FIG. 1 schematically shows a perspective illustration of an exemplary cooling station 34 for a shrink-clamping apparatus. Implementations of cooling stations 34 differing from the illustration in FIG. 1 are of course conceivable. The cooling station 34 comprises shrink-clamping cooling devices 36. The cooling station 34 comprises several cooling places 38, 38'. The various cooling places 38, 38' are configured for a cooling of tool holders 10, in particular heat-shrink chucks, having different shapes and/or different sizes (cf. also FIG. 2). The cooling station 34 comprises a display unit 30. The display unit 30 is realized as a monitor screen. The display unit 30 is at least configured for an output and/or display of information concerning the shrink-clamping cooling device(s) 36. The cooling station 34 may be operable manually or automatedly, for example by means of a handling robot (not shown). The cooling station 34 may be realized in a combination with a shrink-clamping station comprising at least one induction heating unit (not shown) or may be realized separately from the shrink-clamping station.

FIG. 2 shows a schematic sectional view of the shrink-clamping cooling device 36. The shrink-clamping cooling device 36 is configured for a cooling of the previously heated tool holders 10. The shrink-clamping cooling device 36 comprises a cooling element 12. The cooling element 12 is embodied as a cooling cuff/cooling bell. The cooling element 12 is configured for a flowthrough of a cooling fluid. The cooling element 12 forms a cooling region 14. The cooling region 14 is configured for creating a heat-conductive contact with the tool holder 10 that is to be cooled. The cooling region 14 is realized as a cooling chamber 22. The cooling chamber 22 is in a radial direction 20 of the cooling element 12 completely enclosed by the cooling element 12. The cooling chamber 22 is enclosed by the cooling element 12 in a ring-shaped manner. The cooling chamber 22 is configured to completely receive/enclose (cf. also FIG. 3) a clamping region 24 of the tool holder 10 that is embodied as a heat-shrink chuck. The tool holder 10 is configured to be inserted into the cooling chamber 22 and/or the cooling region 14 of the cooling element 12 in an insertion direction 40. The insertion direction 40 runs perpendicular to the radial direction 20 of the cooling element 12. The insertion direction 40 runs parallel to an axial direction of the cooling element 12.

The cooling element 12 comprises a contact switch 16. In FIGS. 2 and 4 the contact switch 16 is shown in a non-actuated state 42. In FIG. 3 the contact switch 16 is shown in an actuated state 44. The contact switch 16 is configured to detect a laying-in of the tool holder 10 that is to be cooled into the cooling region 14. The contact switch 16 is configured to detect a presence of the tool holder 10 that is to be cooled in the cooling region 14. The contact switch 16 is configured to detect a taking-out of the (cooled) tool holder 10 from the cooling region 14. The contact switch 16 is embodied as a mechanical switch. The contact switch 16 is embodied as an elastically pre-tensioned pressure switch. The contact switch 16 is arranged within the cooling region 14.

In the non-actuated state 42, the contact switch 16 protrudes at least partially from a wall 18 of the cooling element 12 that delimits the cooling region 14. In the non-actuated state 42, the contact switch 16 protrudes into the cooling chamber 22. In the actuated state 44, the contact switch 16 is sunk in the wall 18 of the cooling element 12 that delimits the cooling region 14. The contact switch 16 is in the actuated state 44 arranged outside the cooling chamber 22. In particular in the non-actuated state 42 and in the actuated state 44, the contact switch 16 penetrates in the radial direction 20 the wall 18 of the cooling element 12 that delimits the cooling region 14. The contact switch 16 has a contact tip 26. In the non-actuated state 42, the contact tip 26 of the contact switch 16 protrudes from the wall 18 of the cooling element 12. The contact tip 26 of the contact switch 16 has a rounded surface. The contact tip 26 of the contact switch 16 has an at least substantially calotte-shaped surface. The contact switch 16 is configured for outputting a laying-in signal upon an actuation of the contact switch 16, in particular when the contact switch 16 is pushed into the wall 18 of the cooling element 12. The laying-in signal indicates the laying-in of a tool holder 10 into the cooling region 14. The contact switch 16 is configured for outputting a taking-out signal upon a release of the contact switch 16, in particular if the contact switch 16 is deployed from the wall 18 of the cooling element 12. The taking-out signal indicates the taking-out of the tool holder 10 from the cooling region 14.

The shrink-clamping cooling device 36 comprises a control unit 28. The control unit 28 is at least configured to detect the laying-in signal of the contact switch 16 that indicates the laying-in of the tool holder 10. The control unit 28 is at least configured to detect the taking-out signal of the contact switch 16 that indicates the taking out of the tool holder 10. The control unit 28 is at least configured, upon receiving the laying-in signal, to start a counting of a cooling time. The control unit 28 is at least configured, upon receiving the taking-out signal, to stop a counting of the cooling time. The control unit 28 is at least configured, upon receiving the laying-in signal, to start a countdown of a cooling time that is stored in the control unit 28 for the respective tool holder 10. The control unit 28 is at least configured to transmit the countdown of the cooling time to the display unit 30 for a visual output of the countdown of the cooling time.

The shrink-clamping cooling device 36 comprises an illuminated display 32. The illuminated display 32 may be realized by one or several LED(s), in particular color-changing LED(s). The illuminated display 32 is arranged so as to illuminate at least a surface of the cooling element 12. The illuminated display 32 is integrated in the cooling element 12. The illuminated display 32 is configured to indicate an operation status of the associated cooling element 12. The illuminated display 32 is configured to indicate the operation status of the associated cooling element 12 by color-switching. The illuminated display 32 is configured to indicate at least the operation statuses "ready to operate" (e.g. in green), "cooling process running" (e.g. in red) and "cooling process completed" (e.g. in blue). The control unit 28 is at least configured, upon receiving the laying-in signal, to switch the illuminated display 32 such that an active cooling process is signaled. The control unit 28 is at least configured, upon receiving the taking-out signal, to switch the illuminated display 32 such that renewed readiness to operate is signaled. The control unit 28 is at least configured, when the cooling time stored for the respective tool holder 10 has passed, to switch the illuminated display 32 so as to signal an end of the cooling process, for example by a deactivation of the illuminated display 32 or by color-switching of the illuminated display 32.

The control unit 28 is at least configured, upon receiving the laying-in signal, to moreover activate the cooling function of the cooling element 12, in particular an active cooling system of a cooling unit which the cooling element 12 is connected to. The control unit 28 is at least configured to deactivate the cooling function of the cooling element 12 when the cooling time stored for the respective tool holder 10 has passed.

FIG. 5 shows a schematic flowchart of a method for an operation of the shrink-clamping cooling device 36. In at least one method step 46, a tool holder 10 is identified, in particular before or after a heating of the clamping region 24 for a shrinking-in or for a shrinking-out of a tool into or out of the tool holder 10. In at least one further method step 48, a cooling element 12 of the cooling station 34 that corresponds to the identified tool holder 10 is selected. The corresponding cooling element 12 may signal this, for example, by a blinking of the illuminated display 32 that is assigned to the cooling element 12. In at least one further method step 50, the cooling element 12 is put upon the tool holder 10. Herein the clamping region 24 of the tool holder 10 is inserted into the cooling region 14 of the cooling element 12 along the insertion direction 40. In at least one further method step 52, the laying-in is detected by means of the contact switch 16. For this purpose, the contact switch 16 is deflected from an outer surface of the tool holder 10 and is thus actuated. The contact switch 16 is herein pushed out of the cooling region 14. The contact switch 16 is herein pushed into the wall 18 of the cooling element 12. The laying-in signal is generated by the actuation of the contact switch 16. In at least one further method step 54, following the detection by the contact switch 16 of the laying-in of the tool holder 10 that is to be cooled into the cooling region 14, the countdown of the cooling time stored (characteristic) for the respective identified tool holder 10 is started. In at least one further method step 56, following the detection by the contact switch 16 of the laying-in of the tool holder 10 that is to be cooled into the cooling region 14, the illuminated display 32 is activated and/or switched to a color signaling the active cooling process. In at least one further method step 58, following the detection by the contact switch 16 of the laying-in of the tool holder 10 that is to be cooled into the cooling region 14, the active cooling of the cooling element 12 is activated. In at least one further method step 60, after the countdown of the cooling time, the illuminated display 32 is deactivated and/or switched to a color signaling the completed cooling process. In at least one further method step 62, after the countdown of the cooling time, the active cooling of the cooling element 12 is deactivated. In at least one further method step 64, the cooling element 12 is removed from the tool holder 10, which has now cooled down. Herewith the contact switch 16 returns to the non-actuated state 42, and then, for example, the illuminated display 32 may be switched to a color signaling readiness-to-operate.

REFERENCE NUMERALS

- 10 tool holder
- 12 cooling element
- 14 cooling region
- 16 contact switch
- 18 wall
- 20 radial direction
- 22 cooling chamber
- 24 clamping region
- 26 contact tip
- 28 control unit
- 30 display unit
- 32 illuminated display
- 34 cooling station
- 36 shrink-clamping cooling device
- 38 cooling place
- 40 insertion direction
- 42 non-actuated state
- 44 actuated state
- 46 method step
- 48 method step
- 50 method step
- 52 method step
- 54 method step
- 56 method step
- 58 method step
- 60 method step
- 62 method step
- 64 method step

The invention claimed is:

1. A shrink-clamping cooling device for a cooling of tool holders, with at least one cooling element which forms a cooling region for creating a heat-conductive contact with the tool holder that is to be cooled, wherein the cooling element comprises a contact switch, which is configured to detect at least a laying-in of the tool holder that is to be cooled in the cooling region, the shrink-clamping cooling device further comprising a control unit, which is at least configured to detect a laying-in signal of the contact switch indicating the laying-in of the tool holder, wherein the control unit is at least configured, when receiving the laying-in signal, to start a counting of a cooling time, or wherein the control unit is at least configured, when receiving the laying-in signal, to start a countdown of a cooling time stored in the control unit.

2. The shrink-clamping cooling device according to claim 1, wherein the contact switch is arranged within the cooling region.

3. The shrink-clamping cooling device according to claim 1, wherein, at least in a non-actuated state, the contact switch at least partly protrudes from a wall of the cooling element, which delimits the cooling region.

4. The shrink-clamping cooling device according to claim 3, wherein the cooling region is realized as a cooling chamber which is—at least in a radial direction of the cooling element—completely enclosed by the cooling element, and is configured to receive at least to a large extent a clamping region of the tool holder that is embodied as a heat-shrink chuck.

5. The shrink-clamping cooling device according to claim 3, wherein a contact tip of the contact switch, which protrudes from the wall of the cooling element that delimits the cooling region, has an at least substantially calotte-shaped surface.

6. The shrink-clamping cooling device according to claim 1, wherein the contact switch) is embodied as a mechanical switch.

7. The shrink-clamping cooling device according to claim 1, wherein the contact switch is embodied as an elastically pre-tensioned pressure switch.

8. The shrink-clamping cooling device according to claim 1, wherein the contact switch penetrates at least one wall of the cooling element, which delimits the cooling region, in a radial direction.

9. The shrink-clamping cooling device according to claim 1, wherein the control unit is at least configured, when receiving the laying-in signal, to switch an illuminated display that signals an active cooling process.

10. The shrink-clamping cooling device according to claim 9, wherein the illuminated display is configured to signal at least the active cooling process by a color switching.

11. The shrink-clamping cooling device according to claim 1, wherein the control unit is at least configured, when receiving the laying-in signal, to activate a cooling function of the cooling element.

12. The shrink-clamping cooling device according to claim 9, wherein the control unit is at least configured, when receiving the laying-in signal, to start a countdown of a cooling time stored in the control unit, and wherein the control unit is at least configured, when the cooling time has passed, to switch the illuminated display that signals the active cooling process, and/or to deactivate the cooling function of the cooling element.

13. A shrink-clamping apparatus with a shrink-clamping cooling device according to claim 1.

14. The shrink-clamping cooling device according to claim 1, wherein the contact switch is configured to detect a presence of the tool holder that is to be cooled in the cooling region.

15. The shrink-clamping cooling device according to claim 1, wherein the contact switch is configured to detect a taking-out of the tool holder out of the cooling region.

16. The shrink-clamping cooling device according to claim 1, wherein the contact switch is embodied as a microswitch.

17. The shrink-clamping cooling device according to claim 1, wherein the contact switch protrudes beyond a cooling contact surface of the cooling element, and wherein the contact switch is in a circumferential direction completely surrounded by the cooling contact surface of the cooling element.

18. A method for an operation of a shrink-clamping cooling device, with at least one cooling element which forms a cooling region for creating a heat-conductive contact with the tool holder that is to be cooled, wherein the cooling element comprises a contact switch by means of which at least a laying-in of the tool holder that is to be cooled into the cooling region, is detected, wherein following a detection of a laying-in of the tool holder that is to be cooled into the cooling region, a counting of a cooling time or a countdown of a cooling time is started by the contact switch.

19. A shrink-clamping cooling device for a cooling of tool holders, with at least one cooling element which forms a cooling region for creating a heat-conductive contact with the tool holder that is to be cooled, wherein the cooling element comprises a contact switch, which is configured to detect at least a laying-in of the tool holder that is to be cooled in the cooling region, the shrink-clamping cooling device further comprising a control unit, which is at least configured to detect a laying-in signal of the contact switch indicating the laying-in of the tool holder, wherein the control unit is at least configured, when receiving the laying-in signal, to activate a cooling function of the cooling element, wherein the control unit is at least configured, when receiving the laying-in signal, to switch an illuminated display that signals an active cooling process, wherein the control unit is at least configured, when receiving the laying-in signal, to start a countdown of a cooling time stored in the control unit, and wherein the control unit is at least configured, when the cooling time has passed, to switch the illuminated display that signals the active cooling process, and/or to deactivate the cooling function of the cooling element.

* * * * *